June 24, 1969 N. W. T. NEALE ET AL 3,452,255
VARACTOR DIODE DEVICES
Filed May 4, 1967
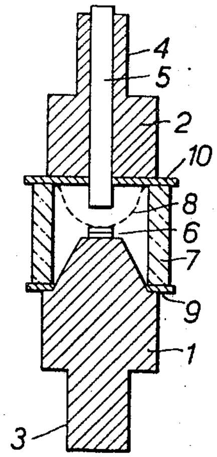
Inventors:
Noel William Thomas Neale
and
Brian Ronald Morden
BY
Baldwin Wight Diller & Brown
ATTORNEYS United States Patent Office 3,452,255
Patented June 24, 1969

3,452,255
VARACTOR DIODE DEVICES

Noel William Thomas Neale, Greenstead Green, near Halstead, and Brian Ronald Morden, Hullbridge, England, assignors to The Marconi Company Limited, London, England, a British company Filed May 4, 1967, Ser. No. 636,048
Claims priority, application Great Britain, May 7, 1966, 20,305/66
Int. Cl. H01l 3/00, 5/00
U.S. Cl. 317—234 5 Claims

ABSTRACT OF THE DISCLOSURE

A combined varactor diode and matching device having a pair of electrodes located at opposite ends of a tubular insulator to form a space in which a varactor diode is carried on the face of one of the members. A metal pin extends through the face of the other member and is adjustable with respect to the diode to vary the voltage standing wave ratio performance of the device.

This invention relates to varactor diode devices and has for its object to provide improved varactor diode devices which shall be particularly suitable for use for switching purposes in wave guides.

Varactor diodes are commonly employed as switches in wave guides and, when so used, it is often a requirement that the diode, when in the forward biassed condition, shall present a good voltage standing wave ratio (V.S.W.R.) This normally involves the provision of a matching device in association with the diode and, if good results are to be achieved over a wide frequency band, the matching device must be physically very close to the diode. This is often difficult and sometimes impossible to achieve with known arrangements involving, as they do, separate diode and matching devices. Moreover, because of unavoidable difference in devices even if made to the same nominal design, a required particular V.S.W.R. performance is generally not repeatably obtainable without rejects and, in practice, a fairly high proportion of devices has to be rejected for failure to achieve a required, specified, V.S.W.R. The present invention seeks to overcome these defects and disadvantages.

According to this invention a varactor diode device comprises two mutually insulated conductive members the separation between which is variable or adjustable, and a varactor diode mounted on one of said members in the variable or adjustable separation space. In this way the diode and a matching device therefor are incorporated in a single structure the V.S.W.R. performance of which can be varied or adjusted by varying or adjusting the aforesaid separation.

A preferred embodiment of the invention comprises a pair of metal end members located at opposite ends of and attached to a tubular insulator to leave a space between their opposite faces, a varactor diode mounted on the face of one of said members and connected on one side thereto, a metal pin extending through the other of said members and variable or adjustable in longitudinal position with respect thereto whereby the separation between the end of said pin and said diode can be varied or adjusted, and means connecting the other side of said diode to said other member.

The pin may be screw threaded in a hole in the member through which it extends so that the aforesaid separation may be varied by screwing the pin in or out. Alternatively the pin may be a slidable fit in a hole in the member through which it extends and is so arranged that it can be adjusted to the best position and be fixed in that position e.g. by soldering it to said member, or in any other convenient way.

The connection between the diode and the member through which the pin extends may conveniently be constituted by a dished washer of metal gauze the middle part of which connects with the diode and the outer edge of which is sandwiched between said member and the adjacent end of the tubular insulator.

The invention is illustrated in the accompanying drawing which is a schematic sectional view of one embodiment.

Referring to the drawing, the device therein shown comprises two generally cylindrical brass end members 1 and 2, formed with outward terminal extensions 3 and 4. The member 2 has an axial hole therethrough. A brass pin 5 is fitted into this hole and is longitudinally variable or adjustable in position therein. The hole may be internally threaded and the pin may be screwed therein. Alternatively the hole may be plain and the pin may be a sliding fit therein.

One end of the member 1 is conical with a flattened end and on this end is mounted a varactor diode 6 one side (i.e. one terminal) of which is in electrical connection with the said member 1.

The two members are held in spaced relation by a cylindrical tubular ceramic insulator 7 into which the conical end of the member 1 projects. The second connection to the diode 6 is made through the member 2 by means of a dished metal gauze washer 8 the middle portion of which connects with the side of the diode facing the member 2 and the edge of which is sandwiched between the said member 2 and the adjacent end of the insulator 7. The parts 1, 7 and 2 are fixed together in known manner customary in ceramic—metal structures, the usual metal interface parts being schematically indicated at 9 and 10.

With this device a required V.S.W.R. ratio can be obtained by adjusting or varying the position of the pin 5 in the member 2 thereby adjusting or varying the capacitance in shunt with the diode. When the device is inserted in a wave guide for use as a switch the length of the insulator 7 will normally span the space between two opposite walls of the guide, the parts outwardly of said insulator passing through suitable holes formed in said walls. When installed in the guide the required V.S.W.R. can be obtained, during practical measurement, by screwing the pin 5 (if a screwed pin is used) in or out or, if a sliding pin is used, by sliding it longitudinally into the best position for the required V.S.W.R. and then fixing it there, e.g. by soldering.

We claim:

1. A varactor diode device comprising two conductive members in adjustable separation from each other to define an adjustable separation space, a varactor diode mounted on one of said members in the adjustable separation space, insulator means supporting said conductive members in insulated, spaced relation and at least one of said conductive members comprising means extending into the separation space for adjusting said separation and thereby controlling the voltage standing wave ratio of said device.

2. A varactor diode device as claimed in claim 1 wherein said insulator means comprises a tubular insulator, said two conductive members comprising a pair of metal end members located at opposite ends of and attached to said tubular insulator to leave a space between their opposite faces, said varactor diode being mounted on the face of one of said members and connected on one side thereto, said means extending into the separation space including a metal pin extending through the other of said members and variable or adjustable in longitudinal position with respect thereto, whereby the separation between the end of said pin and said diode can be varied or adjusted, and means connecting the other side of said diode to said other member.

3. A varactor diode device as claimed in claim 2 wherein the pin is screw threaded in a hole in the member through which it extends so that the aforesaid separation may be varied by screwing the pin in or out.

4. A varactor diode device as claimed in claim 2 wherein the pin is slidably fit in a hole in the member through which it extends for adjustment to the best position to be fixed in that position.

5. A varactor diode device as claimed in claim 2 wherein the means connecting the other side of the diode and the member through which the pin extends includes a dished washer of metal gauze, the middle part of which connects with the diode and the outer edge of which is sandwiched between said member and the adjacent end of the tubular insulator.

References Cited

UNITED STATES PATENTS

| | | | |
|---|---|---|---|
| 2,640,901 | 6/1953 | Kinman | 317—236 X |
| 3,221,277 | 11/1965 | Hauer | 317—234 X |
| 3,280,382 | 10/1966 | Bendig | 317—234 |
| 3,308,355 | 3/1967 | Davis | 317—236 |
| 3,320,497 | 5/1967 | Neuf | 317—234 |

JAMES D. KALLAM, *Primary Examiner.*

U.S. Cl. X.R.

317—236